May 6, 1941.     D. PEETERS     2,241,217
INDEPENDENT WHEEL MOUNTING WITH SUSPENSION
MEANS ACCOMMODATED WITHIN THE WHEEL
Filed April 26, 1939     2 Sheets-Sheet 1
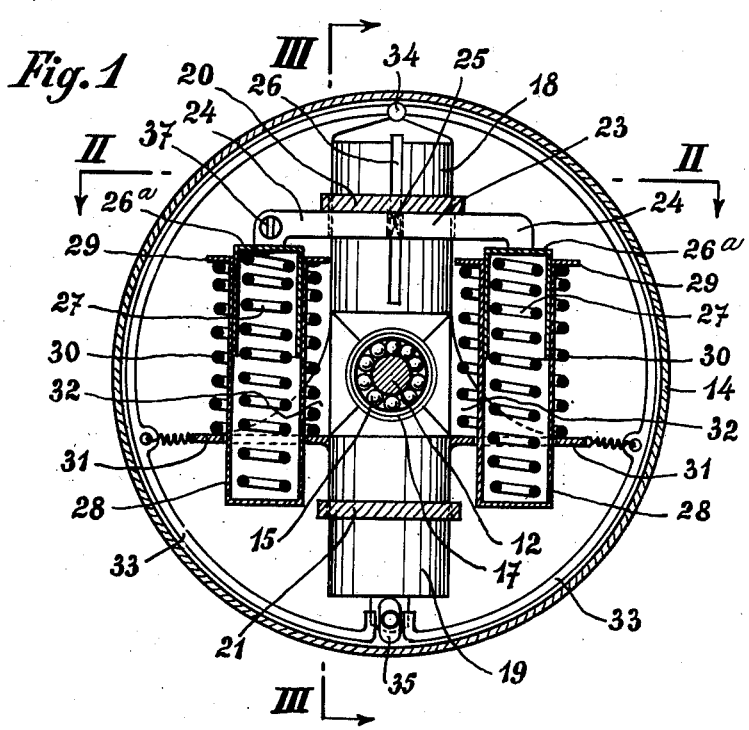
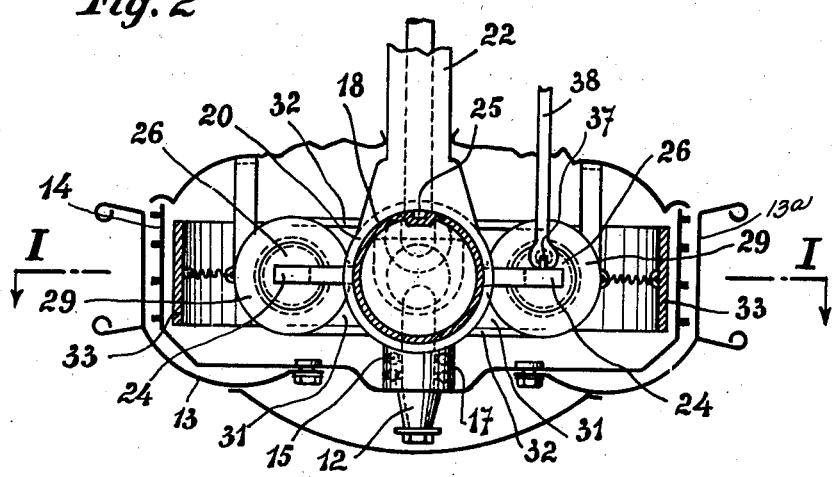
Inventor
Désiré Peeters

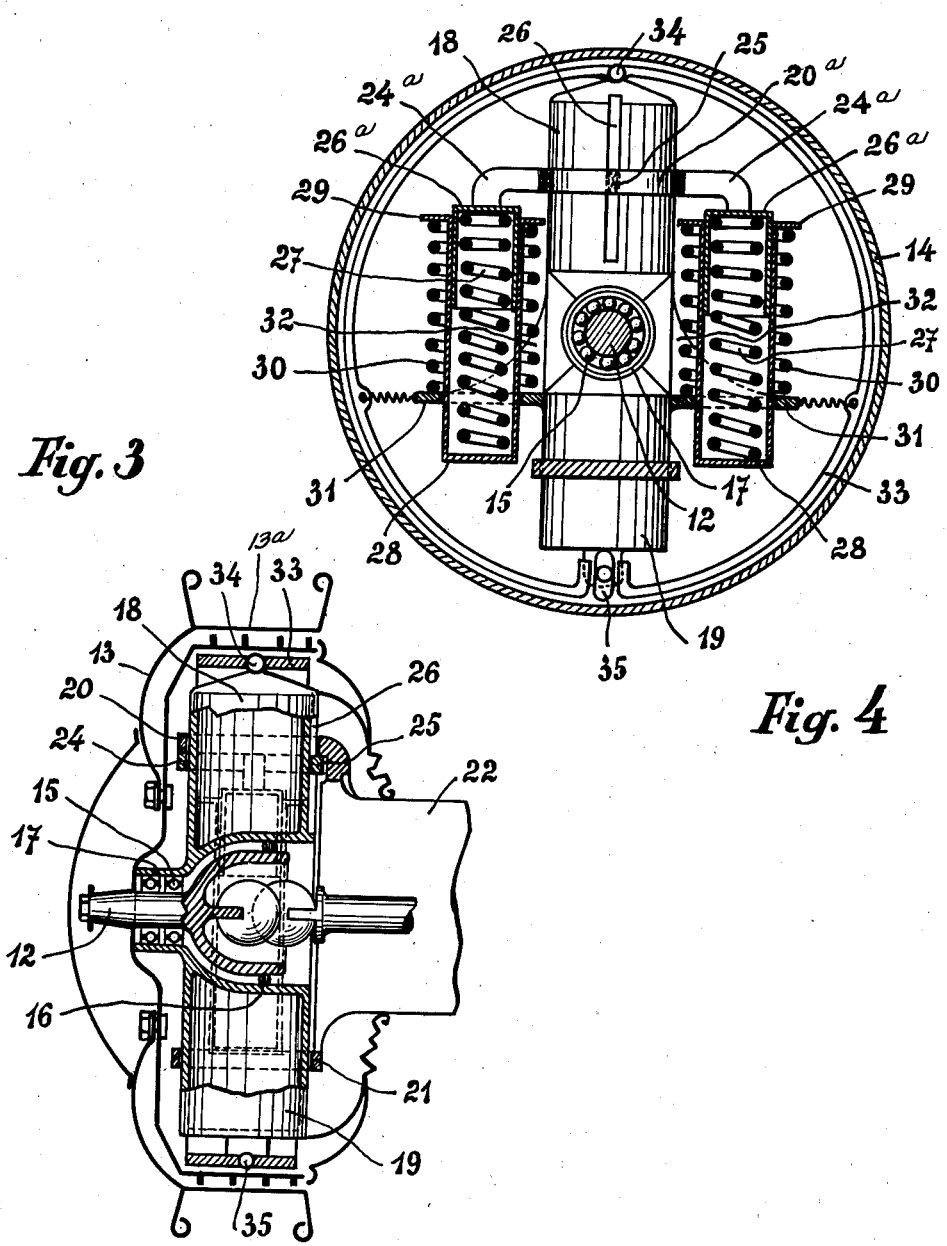

Patented May 6, 1941

2,241,217

UNITED STATES PATENT OFFICE 2,241,217

INDEPENDENT WHEEL MOUNTING WITH SUSPENSION MEANS ACCOMMODATED WITHIN THE WHEEL

Désiré Peeters, Assche, Belgium

Application April 26, 1939, Serial No. 270,055
In Germany April 27, 1938

5 Claims. (Cl. 280—96.2)

The invention relates to the independent mounting of wheels with suspension means accommodated within the wheel, intended more especially for automobiles.

It is an object of the invention to provide a mounting which can be applied to wheels of small diameter, as also to wheels which carry out driving or driving and steering functions as well as to wheels which are merely supporting wheels.

In a form of mounting in accordance with the invention for a steerable wheel, a hub mounted on the spindle of the wheel carries a steering pivot formed by two diametrically opposite parts upon which slide two coaxial vertical guiding collars which are fixed relatively to the chassis and of which the upper rests on a horizontal cross member which extends in the plane of the wheel and which is guided in such manner that it cannot turn on the upper part of the steering pivot and rests on each side of the hub upon the upper end of a helical spring which is carried in coaxial relation to a second helical spring by a support which takes bearing upon the upper end of the second helical spring, the lower end of which rests on a bracket which runs transversely to the first spring and is fixed to the lower part of the steering pivot.

The guiding collar which rests on the transverse suspending member may be retained in contact with this cross member by retaining means permitting rotation relatively to it.

In the case of a non-steerable wheel, the sliding collar which is mounted upon the upper part of the equivalent of the steering pivot in the case of a steerable wheel can be rigidly secured to the transverse suspending member, or may comprise extensions of the transverse suspending member and may be guided on the equivalent of the steering pivot so as to be incapable of turning. The equivalent of the steering pivot in this case, which merely provides a guide, and the collar sliding upon it do not need to be cylindrical.

With the above and other objects in view, the invention consists in the improved combinations and arrangements contained in the embodiments now to be described in detail, and features of which are set out in the claims which follow.

In the drawings:

Fig. 1 is a vertical section, on the line I—I of Fig. 2, through a steerable wheel, Fig. 2 is a horizontal section on the line II—II of Fig. 1, Fig. 3 is a vertical section on the line III—III of Fig. 1, and Fig. 4 is a representation, similar to that of Fig. 1, of a non-steerable wheel.

Referring to Figs. 1 to 3, the axle 12 of the wheel 13 which is provided with a rim 13a and which carries the brake drum 14, has mounted upon it, by means of anti-friction bearings 15 and 16, a hub 17 upon which is formed a steering pivot comprising two coaxially diametrically opposed portions 18 and 19.

These parts 18 and 19 of the steering pivot are engaged by coaxial collars 20 and 21 projecting laterally from the chassis 22.

A cross member 23 engages the part 18 of the steering pivot by means of its collar 24 and a feather 25, which engages in the guiding groove 26 and prevents the cross-member from turning on the part 18 of the pivot, projects into the collar 23.

The collar 20 rests on the collar 23 of the cross-member 24, which rests on the members 26a which cap the springs 27. These springs 27 in turn rest on the supports 28 of which the flanges 29 rest on the springs 30 which bear on brackets 31 fixed to the part 19 of the pivot and provided with strengthening ribs 32 arising from the hub 17.

The springs 27 and their supports 28 extend through openings in the brackets 31.

Brake shoes 33 are shown hinged together at 34 at the top of the part 18 of the steering pivot, with their actuating cams secured to the lower part 19 of the pivot, solely by way of example, in order to indicate that the wheel mounting permits the use of brake shoes within the drum 14. 37 indicates the pivotal connection of the tie rod 38.

The form shown in Fig. 4 includes many of the parts shown in Figs. 1 to 3, and these parts are indicated by the same reference characters, but in this case the transverse suspension member 24a is integral with the guiding collar 20a of the chassis 22 and this collar 20a has an internal feather 25 which engages in the groove 26 to prevent the cross-member from turning on the guide 18. This guide and the cooperating collar 20 could have some non-circular shape, in order to prevent relative rotation between them, in the case of a non-steerable wheel.

In all the figures, the brackets 31 forming bearings for the springs 30 could be fixed to the guide 19, under the collar 21, the amount of movement desired in the suspension being left between this collar and the brackets 31.

I claim:

1. An independent wheel mounting for a vehicle including suspension means located within the wheel comprising a hub member mounted on the spindle of the wheel, a guide member comprising upper and lower diametrically opposed projections from said hub member, a pair of collar members secured to the chassis of the vehicle and mounted for vertical sliding movement upon the upper and lower parts of said guide member respectively, a pair of spring means mounted on diametrically opposite sides of said hub member, said spring means comprising each a pair of coaxial helical springs of which the first is carried by the lower part of said guiding member and the second bears upon said first spring, vertically movable means actuated by the upper collar member and bearing upon said second springs to transmit load thereto from said upper collar member, and means preventing rotation of the vertically movable means relative to the guide member.

2. An independent wheel mounting as claimed in claim 1 in which said vertical movable means is rigidly connected to said upper collar member.

3. An independent wheel mounting as claimed in claim 1 in which said vertical movable means comprises arms rigidly connected to said upper collar member and projecting therefrom on opposite sides thereof.

4. An independent mounting for a steerable wheel as claimed in claim 1 in which said upper and lower collar members are formed independently of the vertical movable means and are mounted for rotary movement about the upper and lower parts respectively of said guiding member and said upper collar member bears upon said vertical movable means.

5. An independent wheel mounting for a vehicle including suspension means located within the wheel comprising a hub member mounted on the spindle of the wheel and allowing free rotation of the spindle within the hub, a guide member carried by the hub with its axis vertical and radial to that of the hub, a pair of helical springs mounted on opposite sides of said hub member, supporting means for the springs extending from the hub, a second pair of helical springs mounted each coaxially with one of said first helical springs, a member bearing on each of said first helical springs, carrying one of said second helical springs and slidably mounted in the supporting means, and a member secured to the chassis of the vehicle mounted for sliding movement along said radial guide member and connected to said second helical springs so as to transmit load thereto.

DÉSIRÉ PEETERS.